United States Patent
Krawczyk

(10) Patent No.: US 7,747,865 B2
(45) Date of Patent: Jun. 29, 2010

(54) METHOD AND STRUCTURE FOR CHALLENGE-RESPONSE SIGNATURES AND HIGH-PERFORMANCE SECURE DIFFIE-HELLMAN PROTOCOLS

(75) Inventor: Hugo M. Krawczyk, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 1179 days.

(21) Appl. No.: 11/348,304

(22) Filed: Feb. 7, 2006

(65) Prior Publication Data

US 2006/0179319 A1 Aug. 10, 2006

Related U.S. Application Data

(60) Provisional application No. 60/651,798, filed on Feb. 10, 2005.

(51) Int. Cl.
*H04L 9/32* (2006.01)
*G06Q 20/00* (2006.01)
(52) U.S. Cl. ......... 713/180; 705/69
(58) Field of Classification Search ........ 713/170, 713/180, 176, 177; 380/30, 45, 282, 260, 380/259
See application file for complete search history.

(56) References Cited

U.S. PATENT DOCUMENTS 4,200,770 A * 4/1980 Hellman et al. .......... 380/30

(Continued)

OTHER PUBLICATIONS

P. Rogaway, M. Bellare and D. Boneh, "Evaluation of Security Level of Cryptography: ECMQVS (from SEC 1)", CRYPTREC report, Information Technology Promotion Agency, Japan, Jan. 2001. Available at http//www.ipa.go.jp/security/enc/CRYPTREC/fy15/doc/1069_ks-ecmqv.pdf.

*Primary Examiner*—Minh Dieu Nguyen
(74) *Attorney, Agent, or Firm*—McGinn IP Law Group, PLLC

(57) ABSTRACT

A method (and structure) of exchange between two parties interconnected by a device or network. A recipient party (verifier) chooses a secret value x for computing a value $X=F1(x)$, where F1 comprises a first predetermined function having at least one argument, the value x being one of the at least one argument of F1. A signing party (signer) chooses a secret value y for computing a value $Y=F2(y)$, where F2 comprises a second predetermined function having at least one argument, the value y being one of the at least one argument of F2. The signer obtains the value X, and the signer has a private key b and a public key B. The signer computes a value $s=F3(y,b,X)$, where F3 comprises a third predetermined function having at least three arguments: the value y, the private key b, and the value X being three arguments of the at least three arguments of F3. There exists a fourth predetermined function $F4(x,Y,B)$ to calculate a value s', F4 having at least three arguments: the value x, the value Y, and the public key B being three arguments of the at least three arguments of F4, but the value s is not an argument of F4. There exists no secret shared between the verifier and the signer that serves as a basis for any argument in any of the functions F1, F2, F3, and F4. The verifier can consider the values s and s' as valid authenticators if value s' is determined to be related in a predetermined manner to value s.

25 Claims, 5 Drawing Sheets

800

Key Computation (by $\hat{A}$ and $\hat{B}$):

Compute $\sigma$ as in HMQV; compute $K_m = H(\sigma, 0)$ and $SK = H(\sigma, 1)$

U.S. PATENT DOCUMENTS

| | | | |
|---|---|---|---|
| 5,491,750 A * | 2/1996 | Bellare et al. | 713/155 |
| 5,761,305 A | 6/1998 | Vanstone et al. | |
| 6,212,281 B1 * | 4/2001 | Vanstone | 380/282 |
| 6,226,383 B1 * | 5/2001 | Jablon | 380/30 |
| 6,487,661 B2 * | 11/2002 | Vanstone et al. | 713/171 |
| 7,073,068 B2 * | 7/2006 | Jakobsson et al. | 713/184 |
| 7,127,063 B2 * | 10/2006 | Lambert et al. | 380/44 |

* cited by examiner

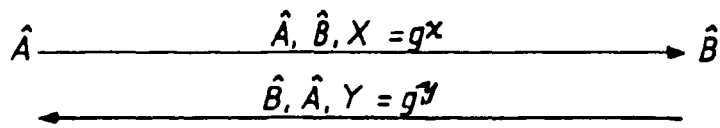

FIG. 1

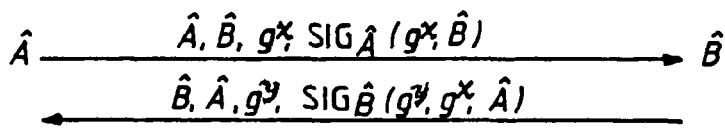

Inputs: $\hat{A}$: Private key $a$, public key $A = g^a$, $\hat{B}$'s public key $B$
$\hat{B}$: Private key $b$, public key $B = g^b$, $\hat{A}$'s public key $A$ Both Protocols: $\hat{A}$ and $\hat{B}$ run a basic Diffie-Hellman exchange ⟋—301
$\hat{A}$ computes $\sigma_{\hat{A}} = (YB^e)^{x+da}$, $\hat{B}$ computes $\sigma_{\hat{B}} = (XA^d)^{y+eb}$ MQV: $d = \bar{X} \stackrel{def}{=} 2^l + (X \bmod 2^l)$, $e = \bar{Y} \stackrel{def}{=} 2^l + (Y \bmod 2^l)$, $l = |q|/2$ ⟋—302
$K = \sigma_{\hat{A}} = \sigma_{\hat{B}}$ HMQV: $d = \bar{H}(X, \hat{B})$, $e = \bar{H}(Y, \hat{A})$ ⟋—303
$K = H(\sigma_{\hat{A}}) = H(\sigma_{\hat{B}})$

Inputs: $\hat{A}$: Private key $a$, public key $A = g^a$, $\hat{B}$'s public key $B$
$\hat{B}$: Private key $b$, public key $B = g^b$, $\hat{A}$'s public key $A$

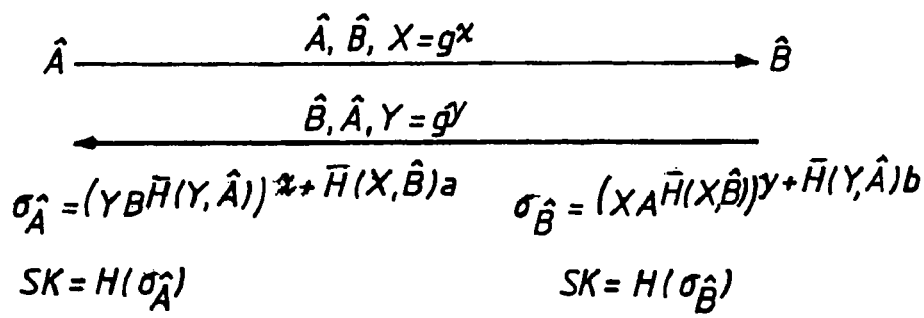

$$\sigma_{\hat{A}} = (YB^{\bar{H}(Y,\hat{A})})^{x+\bar{H}(X,\hat{B})a} \quad \sigma_{\hat{B}} = (XA^{\bar{H}(X,\hat{B})})^{y+\bar{H}(Y,\hat{A})b}$$

$$SK = H(\sigma_{\hat{A}}) \quad\quad\quad SK = H(\sigma_{\hat{B}})$$

Inputs    Signer $\hat{B}$: Private key $b$, public key $B=g^b$, message $m$
Verifier $\hat{A}$: $\hat{B}$'s public key $B$, message $m$ Signing Protocol

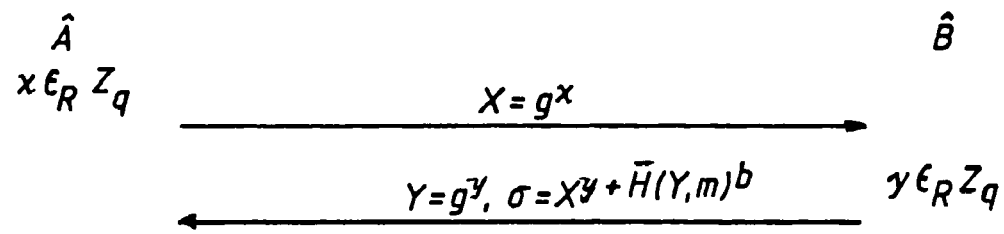

Verifies
$\sigma = (YB^{\bar{H}(Y,m)})^x$
and $Y \neq 0$

FIG. 5

Inputs: Signer $\hat{B}$: Private key $b$, public key $B=g^b$, $\hat{A}$'s public key $A$, message $m$
Verifier $\hat{A}$: Private key $a$, public key $A=g^a$, $\hat{B}$'s public key $B$, message $m$ Signing Protocol

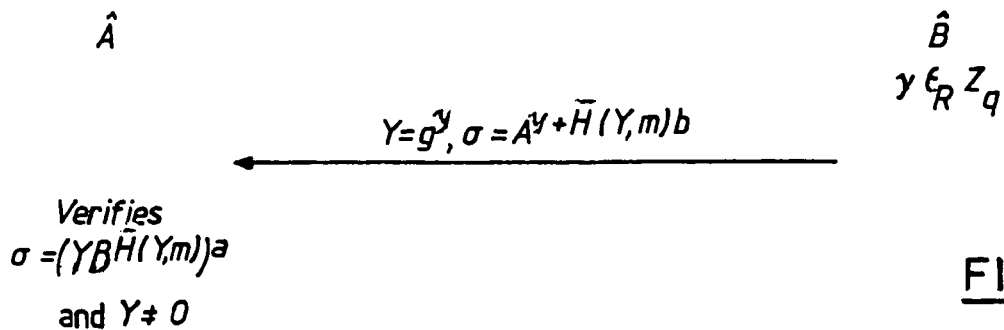

FIG. 6

Inputs: $\hat{A}$ Private key $a$, public key $A=g^a$, $\hat{B}$'s public key $B$, messages $m_1, m_2$
$\hat{B}$ Private key $b$, public key $B=g^b$, $\hat{A}$'s public key $A$, messages $m_1, m_2$ Signing Protocol

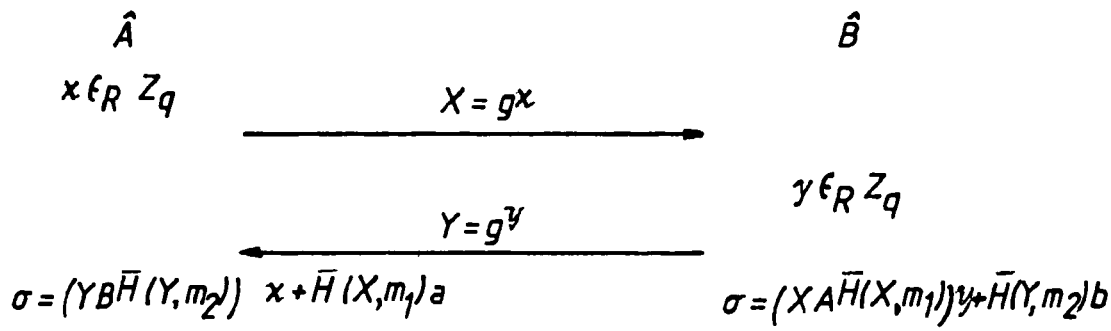

FIG. 7

Key Computation (by $\hat{A}$ and $\hat{B}$):

Compute $\sigma$ as in HMQV; compute $K_m = H(\sigma, 0)$ and $SK = H(\sigma, 1)$

METHOD AND STRUCTURE FOR CHALLENGE-RESPONSE SIGNATURES AND HIGH-PERFORMANCE SECURE DIFFIE-HELLMAN PROTOCOLS

CROSS-REFERENCE TO RELATED APPLICATIONS

The present Application is related to U.S. provisional Patent Application No. 60/651,798, filed on Feb. 10, 2005, to Hugo M. Krawczyk, entitled "HMQV: A HIGH-PERFORMANCE SECURE DIFFIE-HELLMAN PROTOCOL", assigned to the present assignee, the entire contents of which are incorporated herein by reference.

BACKGROUND OF THE INVENTION

1. Field of the Invention

Aspects of the present invention generally relate to signatures that are provably secure to the sending and receiving parties of an information exchange. More specifically, a challenge-response signature scheme possesses the property that both the verifier and the signer can compute the same or related signatures, the former by knowing the challenge and the latter by knowing the private signature key, thereby permitting, in exemplary embodiments, provably-secure variations of conventional key-exchange protocols, including a variation of the well-known MQV protocol.

2. Description of the Related Art

Diffie-Hellman (DH) key-exchange protocol 100 shown in FIG. 1, as originally proposed, is believed to be secure against an eavesdropping-only attacker. The quest for an "authenticated Diffie-Hellman" protocol that resists active, man-in-the-middle attacks has resulted in innumerable ad-hoc proposals, many of which have been broken or shown to suffer from drawbacks. With the development in the last years of rigorous security models for key exchange, those in the art are now in a much better position to judge the security of these protocols, as well as to develop designs that provably withstand realistic active attacks.

As expected, adding safeguards against active attacks results in added complexity, both in terms of additional communication and computation. The latter is particularly significant in protocols authenticated with public key techniques, which usually require additional costly group exponentiation. In addition to the need for sound security, the many practical applications to key exchange have driven designers to improve on the performance cost associated with authentication mechanisms, especially those based on a public key.

One line of investigation, initiated by Matsumoto, Takashima and Imai in 1986, is the search for a public-key (PK) authenticated DH protocol that would add minimal complexity to the protocol. Ideally, and up to the exchange of certified public keys, the protocol's communication is desired to look exactly as the basic DH exchange. In this technique, authentication of the protocol must be obtained via the key derivation procedure: rather than agreeing on the basic Diffie-Hellman key $g^{xy}$, the parties would agree on a key that combines $g^x$, $g^y$ with the public/private keys of the parties.

Due in part to the practical advantages that such a protocol would offer, and in part to the mathematical challenge behind such a design, many protocols have been developed under this approach, often referred to as "implicitly authenticated Diffie-Hellman protocols". Not only can this approach generate protocols that are very efficient communication-wise, but the combination of authentication with the key derivation procedure can potentially result in significant computational savings. For these reasons, several of these "implicitly authenticated" protocols have been standardized by major national and international security standards.

Of these protocols, the MQV protocol appears to have been widely standardized. This protocol has been standardized by many organizations and has recently been announced by the U.S. National Security Agency (NSA) to be the key exchange mechanism underlying "the next generation cryptography to protect US government information", which includes the protection of "classified or mission critical national security information."

Further, MQV appears to have been designed to satisfy an array of security goals. A basic version of the MQV protocol is explained, for example, in U.S. Pat. No. 5,761,305 to Vanstone et al., the entire contents of which are herein incorporated by reference.

Yet, in spite of its attractiveness and success, MQV has so far eluded any formal analysis in a well-defined model of key exchange. The present invention was motivated by the desire to provide such an analysis. Upon conducting a study, the inventor observed that virtually none of the stated MQV goals can be shown to hold, as carried out in the computational key exchange model of Canetti and Krawczyk, and as described in the provisional Application identified above.

This result raised concerns to the present inventor about the security of this conventional protocol. Therefore, based on this analysis that the conventional MQV protocol was not provably secure, there exists a need for additional security to MQV, while preferably retaining its existing performance and versatility.

SUMMARY OF THE INVENTION

In view of the foregoing, and other, exemplary problems, drawbacks, and disadvantages of the conventional systems, it is an exemplary feature of the present invention to provide a method and structure for new variations of MQV, referred to herein as HMQV, that achieve, in a provable way, the security goals of the MQV protocol.

It is another exemplary feature of the present invention to demonstrate a new digital signature scheme, referred to herein as "challenge-response signatures.

It is another exemplary feature of the present invention to demonstrate this challenge-response signature scheme as including a version referred to herein as the "exponential challenge-response" (XCR) signature scheme, derived from the Schnorr identification scheme, as providing a protocol mechanism having the property that both the challenger and signer can compute the same or related signatures, the former by having chosen the challenge and the latter by knowing the private signature key.

Therefore, it is an exemplary object of the present invention to provide a structure and method for improving security for authenticated Diffie-Hellman protocols in which security can be provably demonstrated by implementing therein the concepts of the XCR signature scheme.

In a first exemplary aspect of the present invention, to achieve the above features and objects, described herein is a method of exchange between two parties interconnected by a device or network, including a recipient party (verifier) choosing a secret value x for computing a value $X=F1(x)$, where F1 comprises a first predetermined function having at least one argument, the value x being one of the at least one argument of F1. A signing party (signer) chooses a secret value y for computing a value $Y=F2(y)$, where F2 comprises a second predetermined function having at least one argument, the value y being one of the at least one argument of F2.

The signer obtains the value X, the signer also has a private key b and a public key B. The signer computes a value s=F3(y,b,X), where F3 comprises a third predetermined function having at least three arguments, the value y, the private key b, and the value X being three arguments of the at least three arguments of F3. A fourth predetermined function F4(x,Y,B) exists to calculate a value s', F4 having at least three arguments, the value x, the value Y, and the public key B being three arguments of the at least three arguments of F4 but the value s is not an argument of F4. No secret shared between the verifier and the signer exists that serves as a basis for any argument in any of the functions F1, F2, F3, and F4. The verifier can consider the values s and s' as valid authenticators if value s' is determined to be related in a predetermined manner to value s.

In second and third exemplary aspects of the present invention, also described herein are an apparatus that performs the method described in the preceding paragraph and a signal-bearing medium tangibly embodying a program of machine-readable instructions executable by a digital processing apparatus to perform the method.

In a fourth exemplary aspect of the present invention, also described herein is a method for establishing an authenticated key between two parties interconnected by a device or network. A first party has a private key a and a public key A, the private key a being an integer such that $0 \leq a \leq q-1$, q being a positive integer, g being a generator of a finite group of order q, and A being an element in the group generated by the value g and computed as $A=g^a$. A second party has a private key b and a public key $B=g^b$, the private key b being an integer such that $0 \leq b \leq q-1$. The first party chooses a secret value x for computing a value $X=g^x$, x being an integer such that $0 \leq x \leq q-1$, and the value X is communicated to the second party. The second party chooses a secret value y for computing a value $Y=g^y$, y being an integer such that $0 \leq y \leq q-1$, and the value Y is communicated to the first party. The first party computes a value $s=f_1(Y,B,m)^{\{f_2(x,a,m')\}}$, where m, m' comprise messages known, or exchanged between, the parties, and the second party computes a value $s'=f_3(X,A,m')^{\{f_4(y,b,m)\}}$. At least one of the functions $f_2$ and $f_4$ includes a function H with at least one argument, one such argument being at least one of the messages m and m' where H comprises a cryptographic function being one of a one-way function, an encryption function, and a cryptographic hash function. The first and second party derive a shared key from values s and s', respectively.

BRIEF DESCRIPTION OF THE DRAWINGS

The foregoing and other purposes, aspects and advantages will be better understood from the following detailed description of a preferred embodiment of the invention with reference to the drawings, in which:

FIG. 1 shows the basic (unauthenticated) Diffie-Hellman protocol 100;

FIG. 2 shows a two-message Diffie-Hellman protocol 200 authenticated by using digital signatures;

FIG. 3 shows a comparison 300 of the computation of the session key K in the conventional MQV protocol relative to the computation of the session key of the HMQV protocol of the present invention, demonstrating how HMQV utilizes hashing in one exemplary embodiment that is additional to hashing used in MQV;

FIG. 4 shows a different graphic representation 400 of the HMQV protocol shown in FIG. 3;

FIG. 5 shows exemplarily the computation 500 of XCR;

FIG. 6 shows an example of computation 600 of non-interactive XCR signatures;

FIG. 7 shows computation 700 of a dual XCR signature by the two parties;

DETAILED DESCRIPTION OF EXEMPLARY EMBODIMENTS OF THE INVENTION

Figure 8:
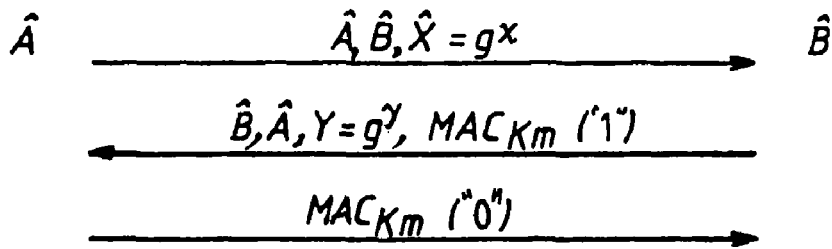
FIG. 8 shows HMQV as exemplarily embodied in a three-message key confirmation (HMQV-C) protocol 800.

Referring now to the drawings, and more particularly to FIGS. 1-11, wherein are shown exemplary embodiments of the methods and structures according to the present invention.

As a preliminary note on groups and notation, all the protocols and operations discussed herein assume a cyclic group G of order q, typically a prime number, generated by a generator g. The bit length of q is denoted by |q| (e.g., $|q|=\lceil\log_2 q\rceil$, meaning the logarithm of q to base 2, as rounded up to the nearest integer), and this quantity is used as an implicit security parameter. The parameters G, g, and q are assumed, for simplicity, to be fixed and known in advance to the parties, as is common in practice. Alternatively, one could include these values in certificates, etc.

The multiplicative representation of group operations is used herein, but the treatment is equally applicable to additive groups, such as elliptic curves, or any other algebraic groups or specific groups, finite fields, composite moduli, etc. In the protocols, public keys, denoted by upper case letters (e.g., A, B), are elements in the group G, and the private keys, denoted by corresponding lower case letters (e.g., a, b), are elements in $Z_q$, where $Z_q$ denotes the set of integer numbers $0, 1, \ldots, q-1$.

For example, a public key $A=g^a$ corresponds to a private key a. The party having A as its public key will be denoted by Â, traditionally considered as "Alice" (a second party B̂ is traditionally considered as "Bob"). In general, the "hat notation" is used to denote the logical or "distinguishing" identities of parties in the protocol, such as a name, an email address, a role, etc. In some cases these identities may be augmented with a digital certificate. For the more complete mathematical analysis provided in the provisional Application, not repeated herein, all parties in the protocol, including the attacker, are considered to be implemented via probabilistic polynomial-time machines. The attacker is also denoted by M, where M might stand for "malicious".

Thus, as shown in FIG. 1, the computation of the session key for the basic unauthenticated Diffie-Hellman protocol 100 consists of an exchange between the two parties, Â, B̂, wherein party Â first sends her key $X=g^x$ to party B̂, and party B̂ then responds by transmitting his key $Y=g^y$ back to party Â, and where x and y are secrets chosen by Â and B̂, respectively, at random from the set $Z_q$, and where the shared session key is computed as $g^{xy}$.

It is noted that, in the description herein, the symbol $\epsilon_R$ is sometimes used to denote a random selection. For example, $x \epsilon_R Z_q$ means choosing the value x at random from the set of integers $Z_q$, typically by using a random or pseudo-random number generator.

The MQV Protocol

The communication in the MQV protocol is identical to the basic unauthenticated DH protocol 100 depicted in FIG. 1, except that the identities $\hat{A}$, $\hat{B}$ may include additional information such as a public-key certificate, or these identities may be omitted all together.

A first challenge in designing a two-message authenticated key-exchange protocol is to prevent a successful attack based on the replay of the first protocol message. This is problematic since the first message cannot include any form of a session-specific "freshness guarantee" (e.g., such as a nonce or a fresh DH value) contributed by the responder. One solution to this problem is to provide freshness via the computation of the session key.

For example, the two-message Diffie-Hellman protocol 200 shown in FIG. 2 is authenticated using digital signatures, as adopted from the ISO (International Standards Organization) 9793 protocol. While the inclusion of $g^x$ under the signature of $\hat{B}$ provides freshness to the authentication, this safeguard does not exist in $\hat{A}$'s message. Yet, the session key, $g^{xy}$ is guaranteed to be fresh (and independent from other session keys), as it is randomized by the fresh y. However, the security of the protocol breaks if the attacker is able to find a single pair $(x, g^x)$ used by $\hat{A}$ in a session with $\hat{B}$, in which case the attacker also learns $SIG_{\hat{A}}(g^x, \hat{B})$. This allows the attacker to impersonate $\hat{A}$ to $\hat{B}$ indefinitely, using the same message and its knowledge of x, and without ever having to learn $\hat{A}$'s long-term private signature key.

This is a serious vulnerability that violates the basic principle that the disclosure of ephemeral session-specific information (e.g., the pair $(x, g^x)$) should not compromise other sessions. This is particularly serious considering that many applications will compute this pair $(x, g^x)$ off-line and keep them in less protected storage than, say, the long-term private key.

So how can a two-message protocol be designed that is immune to replay attacks even when ephemeral information is leaked? The natural answer is to include a long-term private key into the computation of the session key. This has been the approach initiated in the 1986 work of Matsumoto, Takashima, and Ima that motivated many of the so called "implicitly authenticated" variants of Diffie-Hellman, including MQV. In this approach, each party has a long-term DH public key and its corresponding secret exponent, and sessions are generated by combining the session-specific ephemeral DH values with the public and private keys of the parties. Thus, the security of such protocol wholly depends on the exact details of this combination of keys. Remarkably, this seemingly simple idea has been difficult to implement securely, with all previous proposals suffering from several shortcomings.

Considering now the following natural solution to the problem of combining ephemeral and long-term keys in the session-key computation, when $\hat{A}$ and $\hat{B}$ want to exchange a key, they perform a basic Diffie-Hellman protocol and compute the session key as $K = g^{(x+a)(y+b)} = (YB)^{x+a} = (XA)^{y+b}$. In this case, if an attacker learns x but not a, it cannot compute K.

Yet, the protocol is still insecure, as demonstrated by the following simple attack: M chooses a value $x^* \epsilon_R Z_q$, computes $X^* = g^{x^*}/A$, and sends $X^*$ to $\hat{B}$ as an impersonation of an initial message from $\hat{A}$. $\hat{B}$ sends $Y = g^y$ and computes the session key $K = (X^*A)^{y+b}$. Unfortunately, M can also compute K as $(BY)^{x^*}$. Thus, the protocol is insecure.

Moreover, even if the computation of K is changed to be $K = g^{(x+da)(y+eb)}$ for constants d,e, then the attack is still possible. On the other hand, if constants d, e are allowed to vary with X,Y in a way that the attacker cannot control e and Y separately, the above simple attack may not work. This idea brings us back to the design of MQV, where $d = \overline{X}$ and $e = \overline{Y}$.

The computation 301, 302 of the session key K in MQV is shown in FIG. 3, where party $\hat{A}$ possesses a long-term private key $a \epsilon Z_q$ and corresponding public key $A = g^a$. Similarly, B's private/public key pair is $(b, B = g^b)$, and the ephemeral DH values are $X = g^x, Y = g^y$, where x, y are chosen by A, B, respectively. The computation of the session key also uses the values $d = \overline{X}$ and $e = \overline{Y}$, where $\overline{X} = 2^l + (X \bmod 2^l)$ and $\overline{Y} = 2^l + (Y \bmod 2^l)$ for $l = |q|/2$.

It is noted that the computation of the session key by $\hat{A}$ involves one off-line exponentiation for computing $X = g^x$, one on-line exponentiation for computing $B^e$, and an additional on-line exponentiation for $(YB^e)^{x+da}$. However, it is also noted that the second exponentiation uses an exponent e of length $|q|/2$ and, thus, it counts as a "half exponentiation" (e.g., half the number of modular multiplications relative to a regular exponentiation of g). The same count of operations holds for B.

In all, MQV's performance is truly impressive: the same communication as the basic unauthenticated DH protocol (except for the possible transmission of certificates as part of the parties' identities) and just half exponentiation more than the basic protocol, which is a mere 25% increase in computation to achieve an authenticated exchange. This is significantly better than any of the proven DH protocols that rely on digital signatures or public key encryption for authentication, which involve more expensive operations and increased bandwidth. It is also the most efficient of the implicitly-authenticated DH protocols, the closest being the "Unified Model" protocols that require three full exponentiations but offer substantially less security features.

This exceptional performance and the promise of security make MQV an attractive candidate when choosing an authenticated DH protocol. For these reasons, the protocol has been adopted to many standards and widely discussed in the literature. Yet, one question that has not been answered so far is how secure the MQV protocol really is, since no formal analysis of the MQV protocol has been successfully performed in any of the formal models of key-exchange security.

On the other hand, the MQV designers have been explicit about the security goals behind the design. These include the essential security against impersonation and known-key attacks (including resistance to "unknown key share (UKS)" attacks), as well as more specific features such as perfect forward secrecy (PFS) and resistance to KCI (key-compromise impersonation) attacks. Resistance to known-key attacks represents the principle that disclosure of ephemeral session-specific secret information should not compromise the security of other sessions.

The PFS and KCI properties refer to the confinement of security damage in case that the private key of a party leaks to the attacker M. More specifically, PFS means that any session key established between two uncorrupted parties cannot be learned by M even if both parties are corrupted after the session key was erased from the parties' memory. Resistance to KCI attacks requires that an attacker that learns the long-term private key of a party $\hat{A}$, and, hence, could obviously impersonate $\hat{A}$ to other parties, cannot impersonate other uncorrupted parties to $\hat{A}$.

Unfortunately, the results of the analysis of the present inventor, as further described in the above-recited provisional Application, indicate that none of these properties, when formally studied, is satisfied by the MQV protocol. Specifically, it is demonstrated that, in the security model of Canetti and Krawczyk, the protocol is open to a range of attacks that contradict the above-described security properties alleged to be satisfied by MQV.

The HMQV Protocol

The HMQV protocol ("H" can be considered as signifying "Hash") is a simple but powerful variant of MQV that, in several exemplary embodiments, can include hashing, such as shown in step 303 in FIG. 3, additional to conventional MQV protocols, shown in step 302 for comparison. However, it is also noted, as an initial matter, that the hashing step or steps of these exemplary embodiments are not prerequisite to the present invention, since alternate embodiments, both without hashing and using techniques other than hashing, are discussed herein and are also included in the concepts of the invention. A more fundamental concept of the present invention relates to the challenge-response signature scheme from which evolved a number of applications and embodiments, including the exemplary hashed versions of the MQV protocol.

Hashing, as is well known in the art, involves using a hash function to convert a string of characters to a number, a fixed-length string (e.g., a hash or message digest), etc. as an output. The basic functionality of hash functions in cryptography is to provide for a "one-way" or "irreversible" transformation, meaning that it should be infeasible to retrieve the original data, and also infeasible to construct a data block that matches a given hash value. Hash functions may range from simple "mixing" functions to transformations that resemble purely random scrambling. The latter are referred to as "strong cryptographic hash functions" and are often modeled in cryptographic analysis by ideal random functions (or "random oracles").

Several hash functions are widely used for strong cryptographic hashing. For example, MD5 takes an arbitrarily-sized block of data as input and produces a 128-bit (16-byte) hash by using bitwise operations, addition, and a table of values based on the sine function to process the data in 64-byte blocks. Another major hash function is the NIST (National Institute of Standards and Technology) Secure Hash Algorithm (SHA) that provides a 160-bit hash.

Typically, hash functions are not used directly for encryption, but encryption functions do provide for one-way transformation and are, hence, applicable to some hashing uses, including some exemplary embodiments of the present invention. Hash functions are also well suited for data authentication and are used for such purposes in conjunction with secret keys (in these settings they are often referred to as MAC, for Message Authentication Codes, or PRF, for Pseudo-Random Functions) or signature schemes (where hash values are used for "message digests").

Various exemplary embodiments of the present invention use at least one hash function H which is abstracted as an ideal random oracle in the security analysis described in more detail in the above-referenced provisional Application. Two tasks for which the function H is used in these exemplary embodiments are as follows: first, the computation of the exponents d, e; and, second, the derivation of the session key itself.

The first task exemplarily uses two arguments to H and outputs a string of length $|q|/2$, while the second applies H to a single argument and outputs a key of a specified length (e.g., 128 bits). To simplify notation, the same symbol H is used to denote both applications of the hash functions. In practice, one would use a single H, say SHA-1, that can handle variable-length inputs and whose output size can be tuned to fit the above two tasks, possibly using some combination of truncation/expansion in producing the hash result.

It is also noted, however, that if hashing is used as in the first task, it would not necessarily be confined to two arguments, since additional arguments, such as a timestamp, nonce, etc., could be included as input into the hash function, rather than hashing only a message or a party's identity.

When hashing is used, the hash function used to generate the exponents d, e (typically with $l=|q|/2$ bits of output) is often denoted by $\overline{H}$ and the hash function applied to the $\sigma$ values with k bits of output denoted by H. In practice, the same hash function can be used with different output lengths and hence the symbol H is sometimes used instead of $\overline{H}$. As a mnemonic, the bar in $\overline{H}$ indicates that the output of the function is used as an exponent.

As in MQV, the HMQV protocol's communication is identical to the basic DH exchange earlier shown in FIG. 1, with the possible addition of certificates. As exemplified in FIG. 3, the computation of the session key K differs from that of MQV in the computation of the values d and e, which involves the hashing of the party's own DH value and the peer's identity. A typical output of this hash is $l=|q|/2$ bits. In addition, in one exemplary embodiment, HMQV specifies the hashing of the values $\sigma_{\hat{A}}=\sigma_{\hat{B}}$ into k-bit keys where k is the length of the desired session key. In alternate embodiments, one or both $\sigma$ functions are not hashed.

From this description, one can see that HMQV preserves the outstanding performance of MQV both in terms of communication and computation. At the same time, HMQV overcomes all the security shortcomings of MQV that are discussed in the above-referenced provisional patent Application to the largest possible extent in a two-message protocol, as further discussed and proven therein. A more complete account of the security properties and advantages of HMQV and its variants is presented later in this Application.

Challenge-Response Signatures

Although it should now be clear how the HMQV protocol differs from the MQV protocol, there is another aspect of the present invention that is, in a sense, even more fundamental: a main technical tool that stands as the core design and analysis element behind HMQV is a new form of interactive signatures, referred to as "challenge-response signatures" that is implemented on the basis of a new variant of the Schnorr's identification scheme using the Fiat-Shamir methodology. As a result, the "exponential challenge-response" (XCR) signatures of the present invention are obtained. The relation between Schnorr and Fiat-Shamir methodologies and XCR signatures is discussed below.

These XCR signatures are secure in the random oracle model (under the Computational Diffie-Hellman, or CDH, assumption—see below) and have the property that both verifier and signer can compute, exemplarily, the same signature. The former achieves this by knowing the challenge, and the latter can do so by knowing the private signature key. Variations to computing the identical signature include the computation of different, but related, signatures by the signer and verifier.

For example, the signature value computed by one may be a hashed variant of the signature computed by the other, or they may be related by some particular algebraic property, etc. The various HMQV protocols of the present invention are one exemplary mechanism that uses these XCR signatures, wherein they provide authentication (of the DH values and the peer identity) as well as session-key computation.

Thus, XCR signatures, as well as their "dual version" (e.g., DCR), to be discussed shortly, provide for a natural interpretation, both technical and conceptual, of the ideas underlying the HMQV design and analysis.

In addition, it is noted that XCR signatures may also be used in applications beyond the HMQV protocol. In their basic form, XCR signatures do not provide the classical functionality of digital signatures, since they are interactive, challenge-specific and non-transferable. That is, they cannot be used for non-repudiation purposes.

On the other hand, they provide "deniable authentication", an important property for some applications, including key exchange, by which the recipient of an XCR signature can be assured of the origin and integrity of a message or a key but cannot prove this origin to any third party. In particular, these signatures and resultant key exchange protocols are ideally suited for "off-the-record" communications and privacy protection. In addition, non-interactive versions of XCR exist, as discussed below, and, in some cases, they provide alternatives to established signatures schemes, such as the well-known Digital Signature Algorithm (DSA).

As in a regular digital signature scheme, in a challenge-response signature scheme, a signer has a pair of private and public keys used for generation and verification, respectively, of signatures, and the verifier is assumed to obtain the authentic public key of the signer. In particular, the parties are not assumed to share a secret before the initiation of the signing protocol, nor such shared secret is involved in the calculation of the signatures. However, in contrast to regular signatures, in their basic form, challenge-response signatures are interactive and require the recipient (e.g., the verifier) of a signature to issue a challenge to the signer before the latter can generate the signature on a given message. A secure challenge-response signature scheme needs to guarantee that no one other than the legitimate signer is able to generate a signature that will convince the challenger to accept the signature as valid. In particular, a signature is not only message-specific but also challenge-specific.

On the other hand, it is of interest to ensure verifiability of the signature by the challenger, and, thus, there are no assumptions or requirements regarding the transferability, or verifiability by a third party, of the signature. Moreover, the specific scheme described below has the property that the party that chooses the challenge can always generate a signature, on any message, which is valid with respect to that particular challenge. What is even more important for the present application, and which differentiates this scheme from other interactive signatures, is the fact that the verifier can compute, using the challenge, the same (or related) signature string as the signer.

As before, g is the generator of a group G of (usually prime) order q. Also, H is a hash function that outputs |q|/2 bits ($|q|=\lceil \log_2 q \rceil$), but, again, the use of "prime order" and the specific length of the output of H are only exemplary design details of exemplary embodiments and not essential to the invention.

Definition of the XCR Signature Scheme

The exponential challenge-response (XCR) signature scheme 500, illustrated in FIG. 4, is defined as follows: The signer in an XCR scheme, denoted by $\hat{B}$, possesses a private key $b \in_R Z_q$ and a public key $B=g^b$. A verifier (or challenger), denoted by $\hat{A}$, provides an initial challenge X which $\hat{A}$ computes as $X=g^x$, for $x \in_R Z_q$, where x is chosen, and kept secret by $\hat{A}$. The signature of $\hat{B}$ on a given message m, using challenge X, is defined as a pair $(Y, X^{y+\bar{H}(Y,m)b})$, where $Y=g^y$ and $y \in_R Z_q$ is chosen by $\hat{B}$ and the exponent $y+\bar{H}(Y,m)b$ is reduced modulo q. The verifier $\hat{A}$ accepts a signature pair $(Y, \sigma)$ as valid (for message m and challenge $X=g^x$) if and only if it holds that $(YB^{\bar{H}(Y,m)})^x = \sigma$.

We use the following notation: for a given message m, challenge X, and value Y, we define $XSIG_{\hat{B}}(Y, m, X) = X^{y+}$ $\bar{H}(Y,m)b$, i.e, $XSIG_{\hat{B}}$ denotes the second element in an XCR signature pair. As a general note, it is worth observing that the above use of the word "message" is representative of any form of data or information that can be represented by a stream of bits, including transmitted data, files, media, etc, and can by itself be the hashed version of a longer message. This message can be input to the parties as shown in FIG. 5, or it can be transmitted from one party to another, or be provided by a third party, an external source, etc As described in this Application, advantages of XCR signatures include: analytical soundness (provability), computability by both verifier and prover, duality (a single computation representing the conjunction of signatures by two or more parties), "hashability" (i.e., the ability to work with, and verify, hashed signatures), derivation of keys or common values, non-transferability and deniability, convertibility (of deniable signatures into traditional non-repudiable signatures), providing a more robust alternative than DSS (especially in interactive environments), and the existence of non-interactive variants.

It may be illustrative to motivate the design of the XCR scheme via its relation to the Schnorr's identification scheme from which the XCR signatures are derived. Schnorr's (interactive) identification scheme consists of a proof of knowledge of the discrete logarithm b for a given input $B=g^b$. Let $\hat{B}$ denote the prover in this scheme (that possesses b) and $\hat{A}$ the verifier (that is given the input B). The basic Schnorr's identification consists of three messages:

(i) $\hat{B}$ chooses $y \in_R Z_q$ and sends $Y=g^y$ to $\hat{A}$;
(ii) $\hat{A}$ responds with a random value $e \in_R Z_q$; and
(iii) $\hat{B}$ sends $\hat{A}$ the value $s=y+eb$. $\hat{A}$ accepts if and only if $g^s=YB^e$ holds.

This protocol is a public-coin zero-knowledge proof of knowledge (of b) against an honest verifier $\hat{A}$ (e.g., one that chooses e uniformly at random). Therefore, it can be transformed via the well-known Fiat-Shamir methodology into a signature scheme, namely $SIG_{\hat{B}}(m)=(Y, y+H(Y,m)b)$, that is provably secure in the random oracle model.

Now, consider the following four-message variant of Schnorr's protocol in which a first message from $\hat{A}$ to $\hat{B}$ is added. In this first message, $\hat{A}$ sends to $\hat{B}$ a value $X=g^x$. Then, the three messages from Schnorr's scheme follow, except that in message (iii), that is, the fourth in the modified protocol, rather than sending $s=y+eb$ to $\hat{A}$, $\hat{B}$ sends $S=X^s$. $\hat{A}$ accepts if and only if $S=(YB^e)^x$. It can be shown that this protocol is a proof of the "ability" of $\hat{B}$ to compute the Diffie-Hellman value CDH(B,X) for any value $X \in G$. Moreover, the protocol is zero-knowledge against a verifier $\hat{A}$ that chooses e at random, while X may be chosen arbitrarily.

By applying the Fiat-Shamir transformation to this protocol, one obtains the challenge-response signature XCR of the present invention. This also explains why the term "exponential" is used in naming the XCR scheme: it refers to the replacement of $s=y+eb$ in the Schnorr scheme with $X^s$ in the last message of the protocol.

Additional aspects of security of the XCR signature scheme under the CDH assumption are further discussed in the above-identified provisional Application.

In explaining some of the terminology above, for two elements $U=g^u$, $V=g^v$ in G', we denote by CDH(U,V) the result of applying the Diffie-Hellman computation U and V (e.g., $CDH(U,V)=g^{uv}$). An algorithm is called a "CDH solver for G" if it takes as input pairs of elements (U,V) in G and outputs the Diffie-Hellman result CDH(U,V). The main intractability assumption used in the analysis further provided in the provisional Application is the Computational Diffie-Hellman (CDH) assumption. We say that the CDH assumption holds in the group G if, for all efficient CDH solvers for G, the probability that, on a pair (U,V), for U,V$\in_R$G, the solver computes the correct value CDH(U,V) is negligible (the probability taken over the random coins of the solver and the choice of U,V independently at random in G).

The Number of Bits in $\overline{H}$(Y,m)

Let l be the number of bits in the output of $\overline{H}$(Y,m). Clearly the smaller l implies the more efficient the signature scheme is. On the other hand, a too small l implies a bad security bound, since once the exponent $\overline{H}$(Y,m) is predictable, the signature scheme is insecure. But how large an l is needed for security purposes?

It can be shown (see the discussion in the above-referenced provisional Application) that setting l=½|q| provides a good security-performance trade-off and, hence, this value is used in the exemplary specification of XCR signatures (and for its exemplary application to the HMQV protocol of the present invention).

Changing the Order of Interaction with B

In some applications of XCR signatures, in particular as applied to the analysis of the HMQV protocol, the order of interaction between the challenger $\hat{A}$ and the signer $\hat{B}$ may be changed.

In the above definition of the XCR scheme, $\hat{A}$ presents $\hat{B}$ with the message m at the same time that it provides the challenge X to $\hat{B}$, thus allowing $\hat{B}$ to immediately respond with the signature pair (Y, XSIG$_B$(Y,m,X)). In the modified version now considered, there is the following order of interaction:

(i) $\hat{A}$ presents message m to $\hat{B}$ and $\hat{B}$ outputs Y, then, at some later point, (ii) $\hat{A}$ provides (Y,m,X) to $\hat{B}$, and $\hat{B}$ outputs XSIG$_B$(Y,m,X).

Now, assume a party $\mathcal{F}$ queries to $\hat{B}$ to take this modified order. In particular, $\mathcal{F}$ can interleave different interactions with $\hat{B}$, namely, $\mathcal{F}$ can run several instances of step (i) before running the corresponding step (ii). This requires $\hat{B}$ to keep state after step (i) with the values of Y, y, and m. When $\mathcal{F}$ later presents (Y,m,X) in step (ii), $\hat{B}$ checks that it has the pair (Y,m) in its state and, if so, responds with XSIG$_B$(Y,m,X) and erases (Y,m) from its state (if $\hat{B}$ did not have the pair (Y,m) in its state, then it does not issue the signature).

Note that this specification of $\hat{B}$'s actions ensures that $\hat{B}$ will never use the same value of Y for two different signatures. It can be easily verified that the proof of security of XCR signatures remains valid for this modified order, simply because the simulation of the choice of Y by $\hat{B}$ does not require the knowledge of X, but only the value of m needed to determine $\overline{H}$(Y,m)).

A Hashed XCR Variant (HCR)

It is possible to replace pairs of XCR signatures (Y,σ) with pairs (Y,H(σ)), where H is a hash function, and such "hashed XCR" signatures are abbreviated as "HCR". Note that, because of the XCR property by which the verifier is able to recompute σ, given Y, then it can also compute H(σ) and, hence, be able to verify the modified HCR signature.

HCR signatures have a range of properties that are important in some settings. For example, they may be shorter than regular XCR signatures, they may result in random or pseudo-random values, they may prevent the attacker from learning any algebraic structure in σ, etc.

In particular, in interactive and verifier-specific authentication environments (such as in key exchange protocols), HCR signatures offer a more secure alternative to DSA signatures. Indeed, while in DSA, the disclosure of a single ephemeral exponent (e.g., k in the component r=$g^k$ of a DSA signature) renders the signature scheme totally insecure by revealing the private signing key, HCR signatures are unforgeable even if the ephemeral exponent y is revealed to the attacker (provided, in this case, that the signer tests the order of the challenge X or uses a co-factor exponentiation to force the value to be of order at least q).

A Non-Interactive XCR Variant

XCR (and HCR) signatures can be made non-interactive, but verifier-specific, by putting X=A, where A is a public key of the verifier, as shown in FIG. 6. This provides for a very efficient non-interactive verifier-specific deniable authentication mechanism. In a variation, rather than using a unique public key A of party $\hat{A}$, the latter may publicize (e.g. post in a web site) one or more challenges for use by a signer, thus making these challenges available even if $\hat{A}$ itself is not available at the time of signing.

Convertible XCR Signatures

A salient property of XCR signatures (which, in particular, differentiates them from other "deniable" challenge response mechanisms, including those based on shared secrets and public-key encryption), is the ability to "convert" these signatures into regular, non-repudiable, signatures. Convertible signatures possess the property of deniable authentication, namely, they can be verified only by the intended receiver, but also allow the signer to eventually prove that he or she is the author of a given signature without revealing his private signing key.

This convertibility from a private to a public signature may be needed, for example, for official off-the-record communication that, after a number of years, must be converted into verifiable public records. In the case of XCR signatures, a signature (Y,σ) on a message m under a challenge X can be converted by the legitimate signer into a regular non-repudiable signature by revealing the value y+$\overline{H}$(Y,m)b.

While other (recipient-specific) convertible signatures have been presented in the literature, none of these allow the intended recipient (or challenger) to re-compute the signature by itself and, hence, do not share the many advantages that this re-computation property provides to XCR signatures, as exemplified by the following Dual XCR signatures.

Dual XCR Signatures (DCR)

An important property of XCR signatures is that the challenger, having chosen the challenge, can compute the signature by itself. Here it is shown how to take advantage of this property in order to derive a related challenge-response signature scheme (which is referred herein as the "dual XCR scheme", or DCR for short) with the property that any two parties, $\hat{A}$, $\hat{B}$, can interact with each other with the dual roles of challenger and signer, and each produce a signature that no third party can forge. Moreover, and this is what makes the scheme significant to the HMQV protocol, the resultant signatures by $\hat{A}$ and $\hat{B}$ have the same value. More precisely, they have the same XSIG component in an XCR signature pair.

Definition: The dual (exponential) challenge-response (DCR) signature scheme. Let $\hat{A}$, $\hat{B}$ be two parties with public keys A=$g^a$, B=$g^b$, respectively. Let $m_1$, $m_2$ be two messages. The dual XCR signature (DCR for short) of $\hat{A}$ and $\hat{B}$ on messages $m_1$, $m_2$, respectively, is defined as a triple of values: X, Y, and DSIG$_{\hat{A},\hat{B}}$($m_1$,$m_2$, X,Y)$\doteq g^{(x+da)(y+eb)}$, where X=$g^x$ and Y=$g^y$ are challenges chosen by $\hat{A}$, $\hat{B}$, respectively, and the symbols d and e denote $\overline{H}$(X,$m_1$) and $\overline{H}$(Y,$m_2$), respectively. (See FIG. 7.)

As such, a fundamental property of a DCR signature is that, after exchanging the values X and Y (with x and y chosen by $\hat{A}$ and $\hat{B}$, respectively), both $\hat{A}$ and $\hat{B}$ can compute (and verify) the same signature $DSIG_{\hat{A},\hat{B}}(m_1,m_2,X,Y)$. This can be seen from the following equivalences:

$$DSIG_{\hat{A},\hat{B}}(m_1,m_2,X,Y)=g^{(x+da)(y+eb)}=(YB^e)^{x+da}=(XA^d)^{y+eb}$$

where x+da and y+eb are reduced modulo q

Moreover, an attacker cannot feasibly compute this signature, as is demonstrated in the discussion in the above-referenced provisional Application.

Roughly speaking, a dual signature is an XCR signature by $\hat{A}$ on message $m_1$, under challenge $YB^e$, and at the same time, an XCR signature by $\hat{B}$ on message $m_2$, under challenge $XA^d$. More precisely, since the values d and e are determined during the signature process (via the possibly adversarial choice of messages $m_1$, $m_2$), then it can be demonstrated that a DCR signature of $\hat{B}$ is secure with respect to any value $A=g^a$ not chosen by the attacker.

Formal Description of the Basic HMQV Protocol

The HMQV protocol, in its basic two-message exchange, consists of an exchange between parties $\hat{A}$ and $\hat{B}$ of Diffie-Hellman values $X=g^x$ and $Y=g^y$ that serve as challenges from which both parties compute the dual XCR signature $DSIG_{\hat{A},\hat{B}}(\text{"}\hat{A}\text{"},\text{"}\hat{B}\text{"},X,Y)=g^{(x=da)(y+eb)}$. The session key is then derived by hashing this value. In this way, the signature itself need not be transmitted: it is the uniqueness of the signature that ensures a common derived valued of the session key, and it is the unique ability to compute the key (equivalently, the signature) that provides for a proof that the exchange was carried by the alleged parties $\hat{A}$, $\hat{B}$.

Fundamentally, since the messages $m_1$, $m_2$ on which the signature is computed, are the identities of the peers (i.e., $\hat{A}$, $\hat{B}$), both parties get assurance that the key they computed is uniquely bound to the correct identities. This inclusion of the parties' identities, not just the ephemeral Diffie-Hellman values, under the signature (in particular, in the computation of the values d and e), is essential to avoid some authentication failures such as the UKS attacks.

Therefore, a session of the HMQV protocol between two parties $\hat{A}$, $\hat{B}$ consists of a basic Diffie-Hellman exchange of DH values $X=g^x$ and $Y=g^y$ (FIG. 1) with the session key computed as $H(\pi)$, where $\pi=DSIG_{\hat{A},\hat{B}}(m_1=\hat{B},m_2=\hat{A},X,Y)$. That is, $\pi$ is computed as the dual signature of $\hat{A}$ and $\hat{B}$ on each other's identity. The above signature is denoted by the shorthand $\pi(\hat{A},\hat{B},X,Y)$, namely:

$$\pi(\hat{A},\hat{B},X,Y)=DSIG_{\hat{A},\hat{B}}(m_1=\hat{B},m_2=\hat{A},X,Y)=g^{(x+da)(y+eb)}$$

where $d=\overline{H}(X,\hat{B})$, $e=\overline{H}(Y,\hat{A})$, and $A=g^a$, $B=g^b$ are the public keys of parties $\hat{A}$, $\hat{B}$, respectively. It is noted at this point that $\pi(\hat{A},\hat{B},X,Y)=\pi(\hat{B},\hat{A},Y,X)$. In a variation, $H(\pi)$ may be replaced with a different function of $\pi$, in particular the hashing may include additional information such as the identities of the parties, etc.

The HMQV protocol typically runs in a multi-party network where any of the parties can be invoked to run the protocol. Each invocation of the protocol at a party creates a session (a local state containing information related to this specific instance of the protocol), which may produce outgoing messages and the output of a session key at completion. During a session, a party can be activated with three types of activations, as follows (in the following description $\hat{A}$ denotes the identity of the party being activated and $\hat{B}$ denotes the identity of the intended peer to the session).

1. Initiate $(\hat{A},\hat{B})$: $\hat{A}$ generates a value $X=g^x$, $x \in_R Z_q$, creates a local session of HMQV protocol which she identifies as (the incomplete) session $(\hat{A},\hat{B},X)$, and outputs the value X as its outgoing message.

The meaning of this activation is that $\hat{A}$ has been activated as the initiator of a session with $\hat{B}$, and X is the message intended to be delivered to peer $\hat{B}$ as part of this session. Party $\hat{A}$ will be called the "holder" (or "owner") of the session, $\hat{B}$ the "peer" to the session, and X the outgoing (DH) value.

2. Respond $(\hat{A},\hat{B},Y)$: $\hat{A}$ checks that $Y \neq 0$. If so, it generates a value $X=g^x$, $x \in_R Z_q$, outputs X, and completes a session with identifier $(\hat{A},\hat{B},XB,X,Y)$ and session key $H(\pi((\hat{A},\hat{B},X,Y))$. Here, $\hat{A}$ is being activated as the responder in the session with peer $\hat{B}$ and incoming value Y. In this case, $\hat{A}$ immediately completes its session (there are no further incoming messages). Note that, if the incoming value Y is zero, $\hat{A}$ ignores the activation.

3. Complete $(\hat{A},\hat{B},X,Y)$: $\hat{A}$ checks that $Y \neq 0$ and that she has an open session with identifier $(\hat{A},\hat{B},X)$. If any of these conditions fails, $\hat{A}$ ignores the activation, otherwise, she completes the session with session identifier $(\hat{A},\hat{B},X,Y)$ and the session key $K=H(\pi((\hat{A},\hat{B},X,Y))$. This represents the delivery of the second message in the protocol with the incoming value Y, (allegedly) the response from peer $\hat{B}$.

The Three-Message HMQV-C Protocol

The three-message HMQV-C (where C stands for "key Confirmation") protocol is depicted in FIG. 8. The protocol enjoys all the security properties of HMQV and essentially the same computational cost. It adds, however, a third message to the protocol and a slight increase in the length of protocol messages.

In return, HMQV-C provides some properties lacking in the basic HMQV protocol, including key confirmation, PFS, and universal composability.

Key Confirmation

The HMQV protocol provides a fundamental assurance to a party $\hat{A}$ that completes a session with peer $\hat{B}$ and session key K: if $\hat{B}$ is not corrupted, then only $\hat{B}$ may possibly know K. What the protocol does not provide is any assurance to $\hat{A}$ that $\hat{B}$ completed the session or computed the session key. Moreover, $\hat{B}$ might not have been "alive" during the execution of the session.

This is not a drawback just for HMQV, since the same will be true for any two-message public-key based protocol (assuming, as in the typical public key scenario, that no prior shared state was created at an earlier communication between $\hat{A}$ and $\hat{B}$). Furthermore, as pointed out by Shoup, the seemingly natural goal that both parties have assurance that the peer completed the session before each starts using the key cannot be achieved by any key-exchange protocol. Indeed, an attacker can always prevent this mutual assurance by stopping the last protocol message from reaching its destination.

Yet, the weaker assurance to each of the parties that the peer was able to compute the key (but not necessarily that it outputs the key to the calling application) is achievable and referred to in the literature as the key confirmation property. While not crucial for the basic security of a key exchange (e.g., the lack of key confirmation is not a threat to the privacy or authenticity of communications protected with the key), this property may provide a useful "operational sanity check" for some applications.

In this case, protocol HMQV-C is better suited than HMQV, since the added MAC values provide key confirmation. Moreover, the MAC validation confirms the active involvement of the identified peer to the session as well as the fact that this peer possesses a matching session (i.e., with same peers and same session key). Note that in order to achieve these properties, the MAC in HMQV-C does not need to be applied to any specific session information but simply to a single bit used to indicate the "direction" of the message and to prevent reflection. It is also worth noting that the protocol consisting of only the first two messages in HMQV-C already provides key confirmation to the initiator (which may add a useful feature to HMQV without increasing the number of protocol messages).

In many applications of key exchange, lack of key confirmation may lead to a form of "denial of service" (DoS) attack in which a party $\hat{A}$ starts using the key, say to send protected information to $\hat{B}$, while $\hat{B}$ is not able to process this information, since it did not yet establish the key. As said, this situation cannot be avoided completely, since mutual "session completion" confirmation is not achievable.

Moreover, there are more serious forms of DoS attacks against protocols based on public key operations, in which a party is forced to spend significant computation cycles (and create session state) before discovering the invalidity of the peer. Some useful but limited-scope counter-measures to DoS attacks exist that can be applied to any key-exchange protocol (including HMQV) at the expense of added protocol messages.

Perfect Forward Secrecy (PFS)

Perfect forward secrecy is a very desirable property of key exchange protocols by which the compromise of long-term private keys does not endanger the security of old session keys. More formally, if an uncorrupted party $\hat{A}$ establishes a key-exchange session with uncorrupted peer $\hat{B}$, then the session key K remains secure even if the attacker corrupts $\hat{A}$ after K expired at $\hat{A}$, or it corrupts $\hat{B}$ after K expired at $\hat{B}$. No two-message protocol with implicit authentication, including HMQV, can provide full perfect forward secrecy against active attackers. Instead, the best that one can hope for is the weak form of PFS provided by HMQV. The main advantage of HMQV-C, relative to the basic two-message HMQV, is that it lifts this inherent limitation of HMQV and provides for full PFS, as explained further in the provisional Application.

Universal-Composability Security

The model of Canetti/Krawczyk for key exchange, which is the basis for the analysis of MQV and HMQV in the provisional Application, has been expanded into a more ambitious model targeted at ensuring the security of key-exchange protocols when run concurrently with other applications, as is the case in real-world environments. This model is known as the Universal-Composability (UC) model of key exchange.

It can be shown that, for HMQV-C, when the first party to complete a session outputs its session key, then the peer's state contains only information that can be "simulated" from the public information in the protocol and the session key. Canetti/Krawczyk showed that this property, together with the other security properties of HMQV shown in the provisional Application, is sufficient to guarantee the universal composability of the HMQV protocol.

One-Pass HMQV

Figure 9:
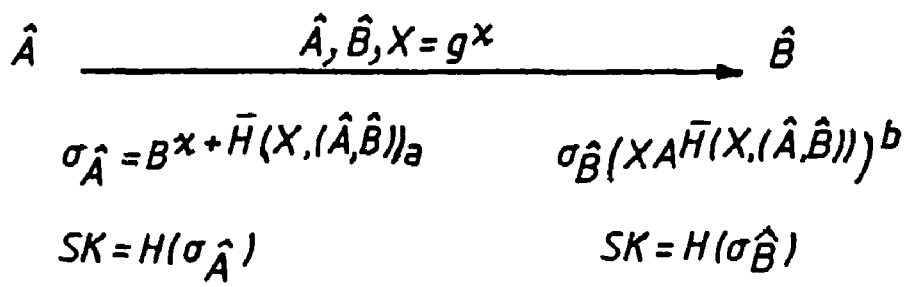
FIG. 9 shows HMQV as exemplarily embodied in a one-pass key exchange 900.

A one-pass key exchange protocol, shown in FIG. 9, consists of a single message sent from a sender $\hat{A}$ to a recipient $\hat{B}$ from which both parties, using their private and public keys, derive a unique key that only $\hat{A}$ and $\hat{B}$ may possibly know, as long as both parties and the session are uncorrupted as defined below.

The requirements from the established key are the same as in a regular key exchange protocol except for the possibility that the message received by $\hat{B}$ is a replay of an older message from $\hat{A}$. This replay is inevitable in a one-pass protocol, though it may be detectable by other means such as synchronized time or shared state.

In addition, such a protocol cannot provide PFS, since, by lack of a session-specific input from $\hat{B}$, the key should be computable with the sole knowledge of $\hat{B}$'s private key.

In one embodiment of the present invention, the one-pass HMQV protocol between parties $\hat{A}$ and $\hat{B}$, with public keys $A=g^a$, $B=g^b$, respectively, consists of a single value $X=g^x$ transmitted from $\hat{A}$ to $\hat{B}$, where $x \in_R Z_q$ is chosen by $\hat{A}$. The session key K is computed by $\hat{A}$ as follows:

(i) Let $(\hat{A}, \hat{B})$ denote a message that includes the two identities $\hat{A}$ and $\hat{B}$, and set d to be the result of $d = \overline{H}(X,(\hat{A},\hat{B}))$;

(ii) Compute $\sigma_{\hat{A}} = XSIG_{\hat{A}}(X,(\hat{A},\hat{B}),B) = B^{x+da}$;

(iii) Set $K = H(\sigma_{\hat{A}})$ where H outputs a number of bits equal to the length of the required key. The same key K is computed by $\hat{B}$, after checking that $X \neq 0$, as $K = H((X A^d)^b)$. In a variation, $K = H(\sigma,\hat{A},\hat{B})$.

In other words, the key in this embodiment of the one-pass HMQV is derived from a non-interactive XCR signature, using $\hat{B}$'s public key as the challenge.

It is also pointed out that the one-pass protocol can be used as an authenticated chosen-ciphertext secure (CCA) encryption scheme. That is, $\hat{A}$ can transmit a message m to $\hat{B}$ encrypted (against chosen ciphertext attacks) as well as authenticated (by $\hat{A}$). In one embodiment, $\hat{A}$ would send a triple (X,c,t), where $X=g^x$, c is a ciphertext obtained as the symmetric chosen-plaintext secure (CPA) encryption of message m under a key $K_1$, and t a MAC value computed on c under key $K_2$. The keys $K_1$ and $K_2$ are derived from a key K computed from X as in the one-pass HMQV protocol.

The whole cost of this procedure is two exponentiations for $\hat{A}$ (one is off-line) and 1.5 for $\hat{B}$. This is just ½ exponentiation more for $\hat{B}$ compared to alternative CCA encryption schemes such as the DHIES (Diffie-Hellman Integrated Encryption Scheme), but, in return, it provides authentication from $\hat{A}$ (with DHIES, this authentication would return a full additional signature from $\hat{A}$). This efficient authenticated CCA encryption is very attractive for "store-and-forward" applications such as the popular "Pretty-Good Privacy (PGP) application, and significantly cheaper than the usual sign-and-encrypt paradigm. The only caveat here is that the identity $\hat{A}$ (and possibly its certificate) needs to be transmitted in the clear, as it is needed for the decryption operation.

Yet another property of the above protocol that is worth noting is that it can be used just as a verifier-specific signature of $\hat{A}$ on message m without necessarily adding the encryption part. This signature, however, is recipient specific and, therefore, does not provide non-repudiation. Instead, it provides deniability, a very valuable feature in many applications, such as PGP.

It is noted that many of the standards that have adopted MQV have also adopted the one-pass variant of it. For standards interested in adopting HMQV in its different forms (one, two, and three messages), it could make sense to define the derivation of the key in the one-pass protocol, similar to the derivation in the other variants of HMQV.

Specifically, by substituting Y with B in the dual signatures that define the HMQV protocol, we obtain the following values for the one-pass key: $\hat{A}$ and $\hat{B}$ respectively compute $\sigma_{\hat{A}} = (BB^e)^{x+da}$ and $\sigma_B = (XA^d)^{b+eb}$, and set the key K to the hash of these (equal) values. Note that, in this case, the exponent e does not add any value to the protocol except for making it compatible with the other variants. It actually somewhat detracts from the protocol efficiency.

Yet, an additional discrepancy remains between the value of $d = \overline{H}(X,(\hat{A},\hat{B}))$ in the one-pass version and $d = \overline{H}(X,\hat{B})$ in the two-message version of HMQV. A way to provide compatibility between the three modes would be to have in all of them $d = \overline{H}(X,\hat{B})$, $e = \overline{H}(Y, \hat{A})$, where Y=B in the one-pass case, and add the identities Â, B̂ to the session-key derivation function: namely, K=H(σ,Â,B̂) (with the order of Â and B̂ defined using some fixed criterion). This replaces the need to add Â in the computation of d. It also has the advantage of strengthening HMQV in the case of leaked pre-computed DH values and avoiding potential unknown key share attacks.

Summary of Security Aspects of HMQV

Compared to the conventional MQV protocol, the HMQV protocol provides a number of performance advantages, including the following. HMQV provably dispenses with the need for costly prime-order tests on the DH values transmitted in the protocol. As demonstrated in the provisional Application, the only way an attacker can benefit from the choice of rogue DH values is by choosing those to be zero, and, thus, a simple non-zero check is all that is required in HMQV. Hence, there is no need for prime-order tests or for the co-factor h used currently in the MQV protocol.

The following is a list of properties that the HMQV protocol achieves in a mathematically provable way:

(1) HMQV is secure in the strong formal key exchange model of Canetti and Krawczyk;

(2) HMQV withstands impersonation by attackers that do not have access to the parties' private keys;

(3) HMQV establishes a unique binding between keys and the identities of parties to the exchange, by applying an XCR signature to these identities, thus avoiding UKS and other authentication attacks;

(4) HMQV is secure also in the presence of partial compromise of session keys and other session information; in other words, HMQV is resistant to the so called "known key" attacks. In particular, different session keys are guaranteed to be "computationally independent" from each other;

(5) The protocol provides an additional level of protection, known as resistance to "key-compromise impersonation (KCI)" attacks, i.e., it prevents an attacker that learns the private key of party A to be able to impersonate other parties to A;

(6) The 3-message HMQV protocol with key confirmation provides for provable perfect forward secrecy (PFS), that is, even if long term private keys of two parties are eventually disclosed, the session keys created by these parties prior to the compromise remain secure;

(7) The three-message protocol with key confirmation enjoys the additional security advantage of the so called "universally composable" key exchange protocols, namely, they can be securely composed with other protocols;

(8) The security of HMQV does not depend on special tests on the form and structure of static public keys nor does it require the so called "proof of possession" of corresponding private keys. These advantages of HMQV over similar protocols, including MQV, free certification authorities (CA) from the burden of performing these special checks on registered public keys, thus providing a more realistic and practical assurance of security, in particular, since many local CAs are not capable or configured to do these checks. Moreover, it is worth noting that the very execution of such tests (e.g., proof of possession) by the CA opens the protocols to additional security vulnerabilities;

(9) The two-message and three-message HMQV protocols do not necessitate for testing of the order of the ephemeral public keys (i.e., the values X and Y), thus avoiding a test that could be costly in some cases. These tests are needed, however, if the security of the protocol is to withstand attackers that may learn the ephemeral secret keys of the parties. This test is needed also for the security of the one-pass HMQV protocol. As with MQV, these tests can be replaced with the "cofactor exponentiation" of the σ values in the protocol. Additional tests on group elements, such as membership in a pre-determined group, may be required depending on the underlying algebraic groups.

One significant advantage of the HMQV protocol of the present invention is that it is arguably the most efficient authenticated Diffie-Hellman key exchange protocol in existence with a wide range of security properties that can be proven to hold in a formal mathematical way. Indeed, this formal provability is one main distinction between HMQV and its predecessor MQV.

Not only did MQV fail to have a proof of security, but explicit weaknesses of the protocol have emerged over time (e.g., the work by Kaliski and the report by Rogaway et al), including some weaknesses that were described for the first time in the above-referenced provisional application. These weaknesses, or attacks, have invalidated some of the security claims on MQV made by its inventors and, in particular, they show that MQV cannot be proven secure.

Comparison of XCR Signatures with the "Implicit Signatures" of MQV

As a way of comparison, it is worth noting that MQV, as described in the patents and academic papers, also uses a notion of signatures in the design and description of the protocol. These are called "implicit signatures" in the context of MQV and they follow the more conventional notion of digital signatures in which a signature value can only be produced by the owner of the private signature key (specifically, MQV refers to ElGamal-like signatures formed by linear combinations of the private signing key, and the ephemeral secret and public keys). However, the protocol stops short of using fully the properties of these signatures. In particular, the MQV protocol does not use the signatures as a way to explicitly authenticate the identities of the parties to the protocol, which leads to severe authentication failures such as the famous "unknown key share (UKS)" attacks discovered by Kaliski.

In contrast, HMQV introduces two important elements in its design. One is the use of XCR, which is an exponential version of ElGamal signatures. More specifically, it is an exponential version of Schnorr's signatures, which, in turn, are particular instantiations of El Gamal signatures. The other is the explicit signing of the peer's identity, which ensures the secure binding of a session key to the peers of the session and, in particular, prevent authentication failures such as UKS.

A key novelty of XCR signatures is the property that both signer and verifier (or challenger) can compute the same signature. This property is usually found in authentication mechanisms based on shared-key cryptography (i.e., in cases where both signer and verifier have an a-priori shared key) but is new in public key based signatures. Not only are XCR signatures perfectly suited for the derivation of shared keys, as in HMQV, but they present a variety of advantages as authentication tools, some of which were described above.

It should be clear to one having ordinary skill in the art that the present invention covers a variety of embodiments.

Thus, in one exemplary embodiment, there are two parties, a verifier V and a signer S. The signer S has a private key b and a public key B, and the verifier V is assumed to possess or obtain (e.g., via a digital certificate sent from S) the authentic public key B of S. The authentication protocol for a given message m includes:

(1) V chooses a secret value x and computes a value $X=F_1(x)$, where $F_1$ is a given function, and sends X to S.

(2) S chooses a secret value y and computes a value $Y=F_2(y)$, where $F_2$ is a given function and transmits Y to V.

(3) S computes a value $s=F_3(y,b,X,m)$ where $F_3$ is a given function and transmits s to V.

(4) V computes a value $s'=F_4(x,Y,B,m)$ and decides on the authenticity of m on the basis of the value s' and its relation to the received value s.

Some exemplary variants of this embodiment include:

(a) $F_1$, $F_2$ being one-way functions. In XCR these one-way functions are $X=g^x$ and $Y=g^y$.

(b) In XCR signatures the function $s=F_3(y,b,X,m)=X^{\{y+\overline{H}(Y,m)b\}}$ and $s'=F_4(x,Y,B,m)=(YB^{\{\overline{H}(Y,m)\}})^x$.

(c) Accepting m as authentication if and only if $s'=s$. This last variant makes use of the property of typical XCR signatures by which the verifier can re-compute the signature by virtue of knowing the secret behind the challenge X.

(d) Computing $s=F_3(y,b,X,m)=X^{\{y+\overline{H}(Y,m)b\}}$ and testing that $H(s')=s$, etc.

In at least one embodiment of the application of XCR to HMQV, the value s computed by S in step (3) is never sent to V. Instead, V computes the value s', which is to be identical to s (except if S is an impostor), and uses s (this is σ in HMQV) to derive a session key from it. In particular, V never carries out an explicit verification. In this embodiment, rather than being a method for verifying the authenticity of a message m, there would be a method by which both parties compute a common "authenticated value" (namely, a value that both parties, and only them, can compute), and by which this value is uniquely bound to their identities (an essential condition in typical key exchange protocols achieved in HMQV by the signing, via dual XCR signatures, of the parties' identities).

Additional variations are described in the text above and in the claims.

Exemplary Hardware Implementation

Figure 10:
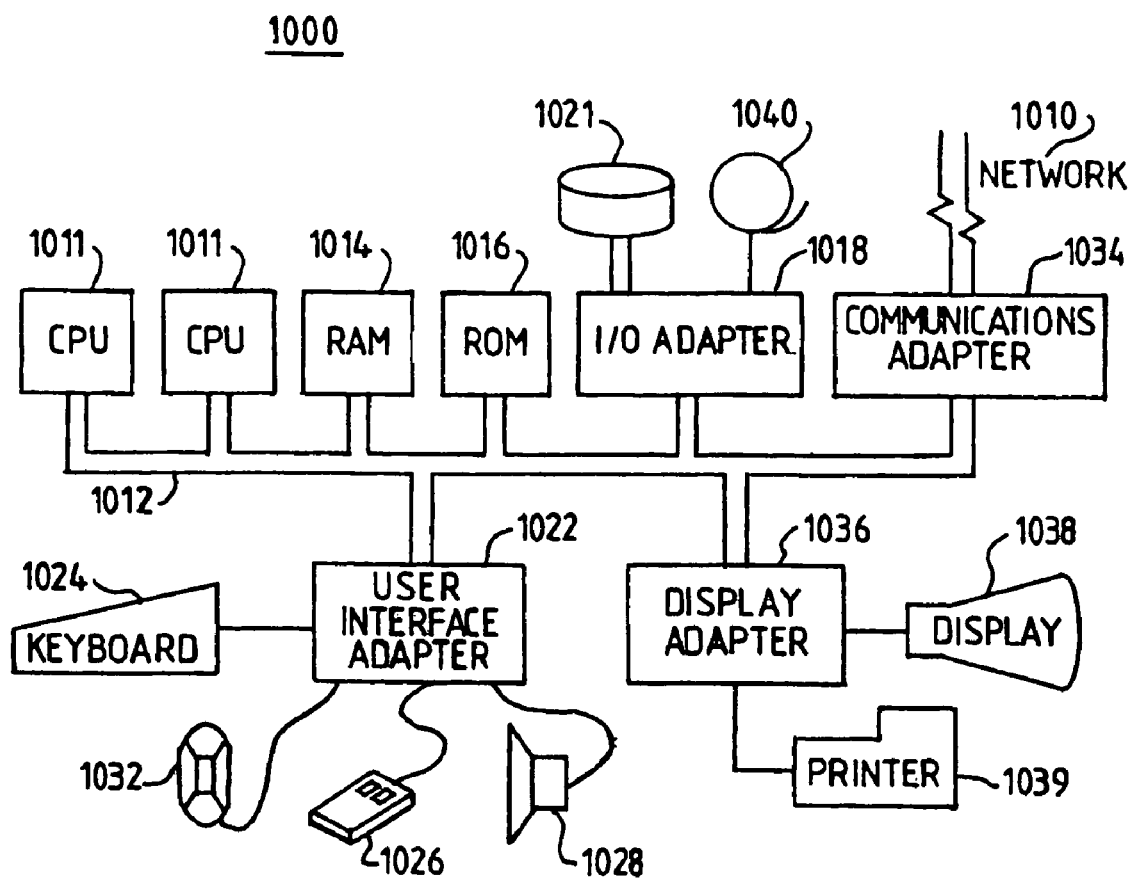
FIG. 10 illustrates an exemplary hardware/information handling system 1000 for incorporating the present invention therein.
Figure 11:
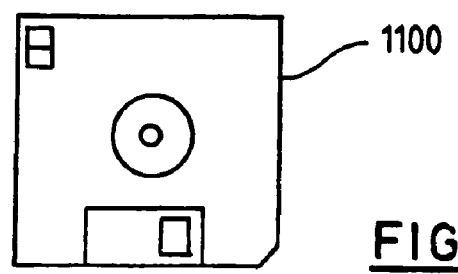
FIG. 11 illustrates a signal bearing medium 1100 (e.g., storage medium) for storing steps of a program of a method according to the present invention.

FIG. 10 illustrates a typical hardware configuration of an information handling/computer system in accordance with the invention and which preferably has at least one processor or central processing unit (CPU) 1011.

The CPUs 1011 are interconnected via a system bus 1012 to a random access memory (RAM) 1014, read-only memory (ROM) 1016, input/output (I/O) adapter 1018 (for connecting peripheral devices such as disk units 1021 and tape drives 1040 to the bus 1012), user interface adapter 1022 (for connecting a keyboard 1024, mouse 1026, speaker 1028, microphone 1032, and/or other user interface device to the bus 1012), a communication adapter 1034 for connecting an information handling system to a data processing network, the Internet, an Intranet, a personal area network (PAN), etc., and a display adapter 1036 for connecting the bus 1012 to a display device 1038 and/or printer 1039 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 1011 and hardware above, to perform the method of the invention.

This signal-bearing media may include, for example, a RAM contained within the CPU 1011, as represented by the fast-access storage for example. Alternatively, the instructions may be contained in another signal-bearing media, such as a magnetic data storage diskette 1100 (FIG. 11), directly or indirectly accessible by the CPU 1011.

Whether contained in the diskette 1100, the computer/CPU 1011, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

While the invention has been described in terms of various exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

Having thus described my invention, what I claim as new and desire to secure by Letters Patent is as follows:

1. A method of exchange between two parties interconnected by a device or network, said method comprising:

a recipient party (verifier) computer choosing a secret value x for computing a value $X=F1(x)$, where F1 comprises a first predetermined function having at least one argument, said value x being one of said at least one argument of F1;

a signing party (signer) computer choosing a secret value y for computing a value $Y=F2(y)$, where F2 comprises a second predetermined function having at least one argument, said value y being one of said at least one argument of F2;

said signer obtaining said value X, said signer having a private key b and a public key B; and said signer computing a value $s=F3(y,b,X)$, where F3 comprises a third predetermined function having at least three arguments, said value y, said private key b, and said value X being three arguments of said at least three arguments of F3, wherein a fourth predetermined function $F4(x,Y,B)$ exists to calculate a value s', F4 having at least three arguments, said value x, said value Y, and said public key B being three arguments of said at least three arguments of F4 but a value s not being an argument of F4, there exists no secret shared between said verifier and said signer that serves as a basis for any argument in any of said F1, F2, F3, and F4, and said verifier considers said values s and s' as valid authenticators when value s' is determined to be related in a predetermined manner to value s, wherein:

said public key $B=g^b$, g being a generator of a finite group of order q, said private key b being an integer such that $0 \leq b \leq q-1$;

said value $x=g^x$, x being an integer such that $0 \leq x \leq q-1$, and said value $Y=g^y$, y being an integer such that $0 \leq y \leq q-1$; and said signer calculates said value $s=f_1(X)^{f_2(m,Y,y,b)}$, $f_1$ comprises a first mathematical function, and $f_2$ comprises a second mathematical function, and argument m comprises a message, q is prime, $f_1$ consists of an identity function, $f_2$ comprises a hash function such that said at least one argument of $f_2$ is hashed, said message m comprises an identity of a party in a computer or system or network, $f_2(m,Y,y,b) = y+H(Y,m)b \mod q$, where H comprises a cryptographic function being one of a one-way function, an encryption function, and a cryptographic hash function, and x is chosen by said verifier at random and y is chosen by said signer at random.

2. The method according to claim 1, wherein a third party other than the signer and verifier calculates s' and determines whether the values s and s' are related.

3. The method according to claim 1, wherein a third party other than the signer and verifier determines whether the values s and s' are related.

4. The method according to claim 1, wherein $X=g^x$ comprises a value published by the verifier to be retrieved by the signer without interaction between the verifier and signer, and wherein at least a portion of the computer executable instruction is stored and executed on the device or the network.

5. A computer on the network interconnecting the verifier and signer stores in a computer readable storage medium according to the method of claim 1, wherein at least a portion of the instructions are executed on the computer of the network, wherein the verifier is included in a first device or computer and the signer is included in a second device or computer communicating through a network connection.

6. A method of exchange between two parties interconnected by a device or network, said method comprising:

a recipient party (verifier) computer choosing a secret value x for computing a value $X=F1(x)$, where F1 comprises a first predetermined function having at least one argument, said value x being one of said at least one argument of F1;

a signing party (signer) computer choosing a secret value y for computing a value $Y=F2(y)$, where F2 comprises a second predetermined function having at least one argument, said value y being one of said at least one argument of F2;

said signer obtaining said value X, said signer having a private key b and a public key B; and said signer computing a value $s=F3(y,b,X)$, where F3 comprises a third predetermined function having at least three arguments, said value y, said private key b, and said value X being three arguments of said at least three arguments of F3, wherein a fourth predetermined function $F4(x,Y,B)$ exists to calculate a value s', F4 having at least three arguments, said value x, said value Y, and said public key B being three arguments of said at least three arguments of F4 but said value s not being an argument of F4, there exists no secret shared between said verifier and said signer that serves as a basis for any argument in any of said F1, F2, F3, and F4, and said verifier can consider said values s and s' as valid authenticators if value s' is determined to be related in a predetermined manner to value s.

7. The method of claim 6, wherein at least one of F1 and F2 comprises a one-way function.

8. The method of claim 6, wherein said values s and s' are determined to be valid authenticators if s=s'.

9. The method of claim 6, wherein at least one of a calculation of s' and a determination of whether said values s and s' are determined to be related is executed by a party other than said verifier and said signer.

10. The method of claim 6, wherein said value s and said value s' are used to derive a secret shared between the two parties.

11. The method of claim 6, further comprising:

said verifier obtains said value Y and uses same to calculate said value s' for determining whether s and s' are related in said predetermined manner.

12. The method of claim 6, wherein a message m is to be authenticated and comprises an argument for F3 and an argument for F4, thereby allowing said value s and said value s' to include information in said message m; and said message is authenticated when said values s and s' are determined to be related in said predetermined manner.

13. The method of claim 12, wherein said value s and said value s are used to derive a secret shared between the two parties.

14. The method of claim 13, wherein said message m includes at least the identity of one of said parties in the exchange.

15. The method of claim 12, further comprising:

said signer sends said value s to said verifier.

16. The method of claim 12, wherein said message is authenticated if said s=s'.

17. The method of claim 6, wherein:

said public key $B=g^b$, g being a generator of a finite group of order q, said private key b being an integer such that $0 \leq b \leq q-1$;

said value $X=g^x$, x being an integer such that $0 \leq x \leq q-1$, and said value $Y=g^y$, y being an integer such that $0 \leq y \leq q-1$; and said signer calculates said value $s=f_1(X)^{f_2(m,Y,y,b)}$, $f_1$ comprises a first mathematical function, and $f_2$ comprises a second mathematical function, and argument m comprises a message.

18. The method of claim 17, wherein said value s comprises a signature of said verifier on m' at a same time that said value s' comprises a signature of said signer on m, wherein the signatures depend on information known to the signer and on specific information provided by the verifier, wherein said message m is deemed as authenticated if said value s is determined to be related in said predetermined manner to said value s', wherein said message m is deemed as authenticated if said value s is determined to equal said value s', and wherein $f_1$ consists of an identity function.

19. The method of claim 17, wherein $f_2$ comprises a hash function such that at least one of said arguments of $f_2$ is hashed, wherein one of the hashed arguments is a non-null message m, and wherein said message m comprises an identity of a party in a computer or system or network.

20. The method of claim 19, wherein $f_2(m,Y,y,b)=y+H(Y,m)b \mod q$, where H comprises a cryptographic function being one of a one-way function, an encryption function, and a cryptographic hash function, and wherein said value $s'=(YB^{\{H(Y,m)\}})^{f_3(x)}$, where $f_3(x)$ comprises a mathematical function having at least one argument, said value x being one argument of said at least one argument of $f_3(x)$, further comprising authenticating said message m if and only if s=s', wherein said verifier has a private key a, a public key $A=g^a$, and message m', said value s comprises a signature of said verifier on m' at a same time that said value s' comprises a signature of said signer on m, and wherein said function f3(x)=x+H(X, m')a mod q.

21. The method of claim 6, wherein x is chosen by said verifier at random and y is chosen by said signer at random.

22. The method of claim 6, wherein said first value $X=g^x$ comprises a value published by said verifier to be retrievable by said signer, thereby permitting a non-interactive version of said authentication.

23. The method of claim 20, wherein said values s and s' are further hashed.

24. A computer readable storage medium tangibly embodying a program of machine-readable instructions executable by a digital processing apparatus to perform at least one of the steps of the method described in claim 6, wherein the signer comprises a first computer and the verifier comprises a second computer.

25. An apparatus comprising:
a calculator to calculate the functions F2 and F3 described in claim 6 for said signer.

* * * * *